United States Patent [19]
Maj et al.

[11] Patent Number: 5,213,891
[45] Date of Patent: May 25, 1993

[54] BLOCK COPOLYETHERAMIDES

[75] Inventors: Philippe Maj, Thiberville; Daniel Cuzin, Port Marly, both of France

[73] Assignee: Elf Atochem S.A., Puteaux, France

[21] Appl. No.: 828,150

[22] Filed: Jan. 30, 1992

[30] Foreign Application Priority Data

Jan. 30, 1991 [FR] France ................. 91 01032

[51] Int. Cl.$^5$ ............................. D02G 3/00
[52] U.S. Cl. ............................. 428/364; 528/272;
528/288; 528/292; 528/307; 528/308;
528/308.6; 528/310; 528/324; 528/326;
528/330; 528/335; 525/425; 525/430; 428/373;
428/395
[58] Field of Search ............ 528/272, 288, 292, 307,
528/308, 308.6, 310, 324, 326, 330, 335;
428/364, 373, 395; 525/425, 430

[56] References Cited
U.S. PATENT DOCUMENTS

| | | | |
|---|---|---|---|
| 4,230,838 | 10/1980 | Foy et al. | 525/408 |
| 4,238,582 | 12/1980 | Deleens et al. | 325/430 |
| 4,252,920 | 2/1981 | Deleens et al. | 525/430 |
| 4,307,227 | 12/1981 | Meyer et al. | 528/288 |
| 4,332,920 | 6/1982 | Foy et al. | 525/408 |
| 4,345,052 | 8/1982 | Mumcu et al. | 525/411 |
| 4,345,064 | 8/1982 | Mumcu | 528/288 |
| 4,349,661 | 9/1982 | Mumcu | 528/288 |
| 4,376,856 | 3/1983 | Tanaka et al. | 528/292 |
| 4,536,563 | 8/1985 | Okitsu et al. | 528/279 |
| 4,578,451 | 3/1986 | Weaver et al. | 528/292 |

FOREIGN PATENT DOCUMENTS

| | | |
|---|---|---|
| 2470141 | 6/1981 | France . |
| 63-035622 | 2/1988 | Japan . |
| 63-182343 | 7/1988 | Japan . |
| 63-277239 | 11/1988 | Japan . |

*Primary Examiner*—John Kight, III
*Assistant Examiner*—Sam A. Acquah
*Attorney, Agent, or Firm*—Burns, Doane, Swecker & Mathis

[57] ABSTRACT

Block copolyetheramides, well adopted for conversion into a wide variety of useful thermoplastic elastomer shaped articles, have the formula:

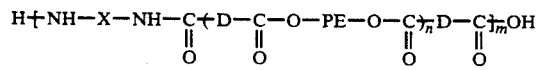

in which D is the residue of a diacid oligamide having an $\overline{M}n$ ranging from 300 to 3,000 and/or the residue of the diacid chain limiter, PE is the residue of a polyetherdiol having an $\overline{M}n$ ranging from 200 to 5,000, X is a straight or branched chain (cyclo)aliphatic or aromatic hydrocarbon having from 4 to 20 carbon atoms, n is a number ranging from 1 to 4, and m is an average number ranging from 2 to 50; these are prepared by polycondensing a multiblock polymer having the formula:

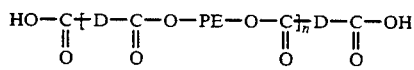

with a diamine $H_2N-X-NH_2$.

20 Claims, No Drawings

BLOCK COPOLYETHERAMIDES

BACKGROUND OF THE INVENTION

1. Field of the Invention

The present invention relates to novel block polymers comprising polyether blocks and oligamide blocks, designated block copolyetheramides.

2. Description of the Prior Art

Numerous block copolyetheramides are known to this art.

Copolyetheramides having the formula

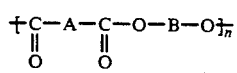

in which A is a polyamide block and B an aliphatic polyether block, are described in French Patents Nos. 2,273,021 and 2,401,947 assigned to the assignee hereof.

These are prepared by molten state reaction of a dicarboxylic polyamide having an $\overline{M}n$ ranging from 300 to 15,000 with a polyetherdiol having an $\overline{M}n$ ranging from to 6,000 under a high vacuum at temperatures ranging from 100° to 400° C. in the presence of one or more metal tetraalkoxides of formula $M(OR)_4$ as catalyst, wherein M is titanium, hafnium or zirconium and R is a hydrocarbon radical having from 1 to 24 carbon atoms.

These block copolyetheramides have good mechanical and chemical properties.

In French Patent No. 2,384,810 copolyetheresteramides are described which are prepared by polymerization, under autogenous pressure at temperatures ranging from 230° to 300° C., of a mixture of one or more polyamide monomers, an alpha,omega-dihydroxy(-polytetrahydrofuran) (or PTMG) having an $\overline{M}n$ ranging from 160 to 3,000, and at least one diacid, in the presence of water, the water then being removed from the reaction mixture, which is then returned to normal or reduced pressure at a temperature ranging from 250° to 280° C.

The polymers obtained are also sequenced or block polymers and have good low-temperature impact strength.

However, the polymers prepared according to the above patents have, for a given hardness, a lower melting point than those according to the invention.

U.S. Pat. No. 4,307,227 describes adhesives of the hot-melt type comprising 50% to 80% of recurring structural units derived from caprolactam and mixtures of dicarboxylic acids, primary amines and polyoxyalkylene glycol.

The process employed (reaction of all of the constituents without catalyst at a temperature ranging from 220° to 250° C.) does not permit the synthesis of polymers in which the polyether blocks have an $\overline{M}n$ higher than 1,000.

Patent Applications J-63/035,622 and J-63/277,239 relate to block copolyetheramides prepared by reacting an oligamide of PA-6,6 containing one or more polyoxyalkylenedioxy blocks with a polyoxyalkylene glycol or a diol of low molecular weight under a high vacuum at a temperature higher than 250° C. in the presence of an esterification catalyst, which is a metal tetraalkoxide.

The use of polyoxyalkylene glycol or diol of low molecular weight results in polymers which have melting points distinctly lower than those of the present invention.

Patent Application J-63/182,343 relates to block copolyetheramides prepared by molten state reaction of PA-6,6 blocks having diamine endgroups with polyether blocks having dicarboxylic chain endgroups. The polymers obtained according to this application have a high melting point, higher than 230° C., which necessitates high conversion temperatures and, therefore, risks of degradation of the polymers during their conversion.

SUMMARY OF THE INVENTION

A major object of the present invention is the provision of block copolyetheramides that are thermoplastic elastomers and which are characterized by the following general formula:

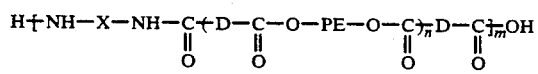

in which D is the residue of a diacid oligamide having an $\overline{M}n$ ranging from 300 to 3,000 and preferably from 500 to 2,000 and/or the residue of the diacid chain limiter; PE is the residue of a polyetherdiol having an $\overline{M}n$ ranging from 200 to 5,000 and preferably from 200 to 3,000; X is a straight or branched chain (cyclo)aliphatic or aromatic hydrocarbon having from 4 to 20 carbon atoms and preferably from 6 to 15 carbon atoms; n is a number ranging from 1 to 4 and preferably close to 1; and m is an average number ranging from 2 to 50 and preferably from 5 to 20.

It will be appreciated that the block copolyetheramides according to the invention may be comprised of D and PE blocks of different nature. For example, the subject block copolyetheramides may comprise oligamide blocks of PA-6 oligomers, on the one hand, and PA-12 oligomers on the other.

DETAILED DESCRIPTION OF THE PREFERRED EMBODIMENTS OF THE INVENTION

More particularly according to the present invention, the diacid oligamides may be prepared by polymerization of lactams and/or amino acids, and optionally up to 50% by weight of one or more diacids, and of one or more diamines and/or their salts, in the presence of a diacid chain limiter.

The preferred oligamides are those which are derived from caprolactam and/or dodecalactam.

Among the diacid chain limiters, adipic and terephthalic acids and preferably dodecanedioic acid are very particularly exemplary.

Exemplary of the polyetherdiols are polyethylene glycol (PEG), polypropylene glycol (PPG) and polytetramethylene glycol (PTMG), as well as mixtures of at least two of the above polyetherdiols; PEG and PTMG alone are very particularly preferred.

Exemplary of the copolyetherdiols are random and-/or block copolymers of ethylene glycol and/or propylene glycol and/or butylene glycol.

The inherent viscosity of the block copolyetheramides according to the invention generally ranges from 0.6 to 2.5 dl/g, preferably from 0.8 to 2 and advantageously from 1 to 1.8. It is determined at 20° C. in m-cresol using an initial concentration of 0.5 g of polymer per 100 g of m-cresol.

Their number average molecular weight generally ranges from 10,000 to 50,000 and preferably from 15,000 to 30,000.

The block copolyetheramides according to the invention may be prepared in two steps:

Diacid multiblock polymers of the formula:

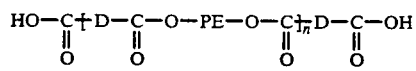

are first prepared by polycondensation of diacid oligamides and polyetherdiols, or of oligamide monomers, diacid chain limiter and polyetherdiols, it being possible for the synthesis of these multiblock polymers to be carried out in accordance with any known polycondensation process, such as solution or interfacial polycondensation and preferably polycondensation in the molten state. Per mole of polyetherdiol, in general (n+1) moles of diacid oligamide or of diacid oligamide chain limiter are employed, where D is as defined above.

The polycondensation in the molten state generally is carried out at a temperature ranging from 230° to 280° under atmospheric pressure or initially under water vapor pressure and then, after pressure release, under atmospheric pressure.

The block copolyetheramides according to the invention are then synthesized by molten state reaction of the multiblock polymers described above with diamines of the formula $NH_2-X-NH_2$.

Exemplary preferred diamines include m-xylenediamine, bis(4-aminocyclohexyl)methane, hexamethylenediamine and, more particularly, dodecamethylenediamine. Advantageously, from 0.8 to 1.3 moles of diamine and preferably from 0.9 to 1.15 moles are employed per mole of diacid oligamide.

It is possible to use esterification and, respectively, amidation catalysts for the above two steps, which catalysts may be added at the onset of reaction and/or during the synthesis.

Zinc acetate is an exemplary esterification catalyst and phosphorous acid $H_3PO_2$ is an exemplary amidation catalyst.

The aforesaid steps may also be carried out under reduced pressure.

The block copolyetheramides according to the invention may be used as such and are suitable for the production of molded and extruded shaped articles, films, sheaths and composite materials, such as multilayer films. They may also be mixed with other polymers and in particular with polyamides.

Certain block copolyetheramides according to the invention have particular properties.

For example, the block copolyetheramides in which the polyether blocks essentially consist of PEG have excellent antistatic and gas permeability properties, either alone or in admixture with other polymers, such as ABS resin, polycarbonate, polyphenylene ether or polyamide.

Among the antistatic block copolyetheramides, those which are preferred are those in which the oligamide blocks are derived from PA-6. Among the block copolyetheramides permeable to gas, those preferred are those in which the oligamide blocks are derived from PA-12.

In order to further illustrate the present invention and the advantages thereof, the following specific examples are given, it being understood that same are intended only as illustrative and in nowise limitative.

As utilized herein and in said examples to follow, $\overline{Mn}$ connotes the number average molecular weight. The Shore hardness D (5 s) was determined in accordance with ISO Standard R 868.

Synthesis of Triblock Polymers

EXAMPLE 1

350 g of PTMG diol having an $\overline{Mn}$ of 2,000 and 360 g of a PA-12 diacid oligamide having an $\overline{Mn}$ of 1,028, limited by adipic acid and having a melting point of 148° C. were placed in a 4-1 stainless steel autoclave provided with an anchor stirrer.

After purging 4 times under 5 bars of nitrogen, the contents of the reactor were placed under a gentle stream of nitrogen at atmospheric pressure and heated to 260° C. over the course of 100 min. The reaction was carried out under these conditions for 120 min and a product was recovered which contained 0.49 meq/g of residual acid functional groups, which corresponded to a polymer having an $\overline{Mn}$ of 4,080 and a melting point of 153° C.

EXAMPLE 2

Following the same procedure and under the same conditions as in Example 1, 604 g of PTMG diol having an $\overline{Mn}$ of 2,000 and 613 g of PA-12 diacid oligamide having an $\overline{Mn}$ of 1015, limited by dodecanedioic acid and having a melting point of 147° C., were reacted at 260° C. under a stream of nitrogen. After heating for 100 min up to 260° C., a triblock polymer containing 0.49 meq/g of residual acid functional groups, which corresponded to a polymer having an $\overline{Mn}$ of 4,080 and a melting point of 155° C., was obtained in a reaction time of 65 min at this temperature.

EXAMPLE 3

Following the same procedure and under the same conditions as in Example 1, 350 g of PTMG diol having an $\overline{Mn}$ of 2,000 and 327 g of PA-112 diacid oligamide having an $\overline{Mn}$ of 933, limited by terephthalic acid and having a melting point of 155° C., were reacted. After heating for 50 min up to 260° C. and a reaction time of 150 min at this temperature under a stream of nitrogen, a polymer was prepared which contained 0.54 meq/g of residual acid functional groups, which corresponded to a polymer having an $\overline{Mn}$ of 3,700 and a melting point of 147° C.

EXAMPLE 4

Following the same procedure and under the same conditions as in Example 1, 200 g of PTMG diol having an $\overline{Mn}$ of 2,000 and 400 g of PA-12 diacid oligamide having an $\overline{Mn}$ of 2,000 and a melting point of 160° C. were reacted. After heating for 45 min up to 260° C. and a reaction time of 300 min at this temperature, a triblock polymer was prepared which contained 0.335 meq/g of residual acid functional groups, which corresponded to a polymer having an $\overline{Mn}$ of 5,970 (target $\overline{Mn}$ 6,000) and a melting point of 169° C.

Synthesis of Block Copolyetheramides according to the Invention

EXAMPLE 5

30 g of the diacid triblock polymer obtained in Example 1 and 1.53 g of dodecamethylenediamine, which corresponded to 1.04 moles of diamine per mole of diacid triblock polymer, were placed in a glass reactor having a useful volume of 100 cm³, which was fitted with a glass anchor stirrer, tubing for the admission of nitrogen and a condenser.

After the reactor had been purged with nitrogen, it was immersed in an oil bath at 220° C. When the mixture of reagents was molten, stirring was commenced and the temperature was increased to 260° C. over the course of 40 min. The reaction was continued for 3 hours at this temperature and the reaction mixture was then progressively placed under vacuum until a residual pressure of about 13.3 Pa was attained. After 2 hours under these conditions, the reaction mixture was progressively restored to atmospheric pressure by the injection of nitrogen and then stirring was stopped and heating was stopped by removing the reactor from the thermostatic bath. After cooling, a thermoplastic elastomer was obtained which had an inherent viscosity of 0.84 dl/g and a melting point of 153° C.

EXAMPLE 6

Following the same procedure and under the conditions described in Example 5, 30 g of the diacid triblock polymer obtained in Example 2 and 1.55 g of dodecamethylenediamine were reacted.

After a reaction time of 15 min at 220° C., 30 min at 240° C., 50 min at 260° C. under a stream of nitrogen at atmospheric pressure and, finally, 3 hours, 30 min, under a reduced pressure of about 26.6 Pa, a thermoplastic elastomer was obtained which had a melting point of 158° C. and an inherent viscosity of 0.78 gl/g.

EXAMPLE 7

Following the same procedure and under the conditions described in Example 5, 20 g of the triblock polymer from Example 3 and 1 g of dodecamethylenediamine were reacted. The reactor was placed under a reduced pressure of about 133 pa and then heated to 200° C. over the course of 5 min. Stirring was initiated and the reaction mixture, which was still under reduced pressure, was heated to 260° C. over the course of 15 min, reducing the pressure to about 13.3 Pa.

After a reaction time of 60 min under these conditions, a thermoplastic elastomer was collected which had a melting point of 163° C. and an inherent viscosity of 0.6 dl/g.

EXAMPLE 8

Following the same procedure and under the conditions described in Example 5, 30 g of the triblock polymer from Example 1, 1.5 g of dodecamethylenediamine and 6 μl of a 50% aqueous solution of hypophosphorous acid were reacted. The reaction mixture, which was maintained under a stream of nitrogen, was heated to 220° C. over the course of 5 min, maintained at this temperature for 10 min and then heated to 240° C. over the course of 7 min and maintained at this temperature for 63 min.

The reaction mixture was, finally, heated to 260° C. over the course of 7 min and maintained at this temperature for 3 hours. A thermoplastic elastomer was thus obtained which had an inherent viscosity of 1 dl/g and a melting point of 156° C.

EXAMPLE 9

In a manner similar to Example 5, 30 g of the triblock polymer from Example 1, 1.5 g of dodecamethylenediamine and 0.06 ml of a 50% aqueous solution of hypophosphorous acid were reacted. After a reaction time of 105 min at 260° C. while sweeping with nitrogen at atmospheric pressure, a thermoplastic elastomer was obtained which had an inherent viscosity of 1.15 gl/g and a melting point of 154° C.

EXAMPLE 10

In a manner similar to Example 9, 34.2 g of the triblock polymer from Example 1, 1.73 g of dodecamethylenediamine and 0.6 ml of a 50% aqueous solution of hypophosphorous acid were reacted.

The reaction mixture was heated under a stream of nitrogen at atmospheric pressure up to 240° C. over the course of 3 min, maintained at this temperature for 10 min and then heated to 260° C. over the course of 8 min. After 38 min at this temperature, a thermoplastic elastomer was obtained which had an inherent viscosity of 1.08 gl/g and a melting point of 146° C.

EXAMPLE 11 (Comparative)

In accordance with the method described in J-63/035,621, 30 g of the triblock polymer from Example 1 and 7.1 g of PTMG having an $\overline{M}n$ of 1,000 were placed in a 100-cm³ glass reactor similar to that of Example 5. After the reactor had been purged with nitrogen, it was immersed in an oil bath maintained at 260° C. Stirring was initiated when the mixture of reagents had melted. After a reaction time of 2 hours under a stream of nitrogen at atmospheric pressure, the pressure was reduced to 13.3 Pa over the course of 30 min. After 10 min, 0.1 g of $Zr(OBu)_4$ was added, which induced a violent reaction. Stirring was stopped after 20 min and the reaction mixture was returned to atmospheric pressure by means of circulation of nitrogen and the tube was then removed from the oil bath and permitted to cool at ambient temperature. A thermoplastic elastomer was obtained which had a melting point of 142° C. and an inherent viscosity of 1.53 dl/g.

EXAMPLE 12 (Comparative)

In a manner similar to Example 11, 20 g of the triblock polymer from Example 1 and 0.85 g of 1,10-decanediol were reacted at 260° C. After 1 hour at this temperature under a stream of nitrogen at atmospheric pressure, the pressure was reduced to 13.3 Pa over the course of 40 min. After a reaction time of 100 min at this temperature, 0.3 g of $Zr(OBu)_4$ was added and the mixture was maintained under this pressure for 90 min. A thermoplastic elastomer was obtained which had an inherent viscosity of 1.14 gl/g and a melting point of 149° C.

EXAMPLE 13

95 kg of lauryllactam and 28.4 kg of dodecanedioic acid were reacted at 290° C. for 2 hours under autogenous pressure in an 880-l stainless steel autoclave provided with a turbine stirrer and previously purged with nitrogen. After restoring to atmospheric pressure, 123.6 kg of PTMG having an $\overline{n}$ of 2,000 were introduced and the mixture was reacted for 3 hours at 240° C. under a stream of nitrogen at atmospheric pressure. After homogenization under autogenous pressure with 7.2 kg of hexamethylenediamine for 1 hour at 240° C., the reaction mixture was returned to atmospheric pressure and placed in an 880-l stainless steel reactor fitted with an anchor stirrer. After introducing 240 g of an 85% aqueous solution of phosphoric acid, the mixture was placed under a reduced pressure of $5.3 \times 10^3$ Pa and after a polycondensation reaction time of 6 hours under these conditions a thermoplastic elastomer was obtained which had a melting point of 150° C., an inherent viscosity of 1.12 dl/g and a Shore hardness D of 28.9.

EXAMPLE 14 (Comparative)

In accordance with the method described in French Patent No. 2,384,810, 11.545 kg of lauryllactam, 3.454 kg of dodecanedioic acid, 0.87 kg of hexamethylenediamine, 15 kg of PTMG having an $\overline{Mn}$ of 2,000 and 2 l of water were placed in a 100-l stainless steel autoclave fitted with an anchor stirrer. After purging several times with nitrogen, the mixture was heated, with stirring, to a temperature of 270° C. under a water vapor pressure of 25 bars and maintained under these conditions for 8 hours.

After reducing for 90 min to atmospheric pressure and applying sweeping with nitrogen, 36.8 g of an 84% aqueous solution of phosphoric acid were introduced and the polycondensation reaction was continued at 270° C. under a stream of nitrogen at atmospheric pressure for 9 hours. A thermoplastic elastomer was obtained which had an inherent viscosity of 1.58 dl/g, a melting point of 147° C. and a Shore hardness D of 34.6.

EXAMPLE 15 (Comparative)

In accordance with the method described in French Patent No. 2,401,947, 11.544 kg of lauryllactam, 3.454 kg of dodecanedioic acid, 0.87 kg of hexamethylenediamine and 2.9 l of water were introduced into a 100-l stainless steel autoclave fitted with an anchor stirrer. After purging several times with nitrogen, the mixture was heated to 270° C. under the autogenous pressure of 32 bars and maintained under these conditions for 3 hours.

The pressure was reduced to atmospheric pressure and the mixture was placed under sweeping with nitrogen and 15 kg of PTMG having an $\overline{Mn}$ of 2,000 were then introduced. The mixture, which was maintained at 250° C. under a stream of nitrogen, was stirred for 3 hours and the pressure was then progressively reduced to 50 mbars and the temperature was reduced to 240° C. 65 cm³ of an 80% solution of $Zr(OBu)_4$ in butanol were then introduced. After 10 min, the pressure was reduced to 10 mbars. After 15 min under these conditions, a white-colored thermoplastic elastomer was obtained which had an inherent viscosity of 1.08 dl/g, a melting point of 45° C. and a Shore hardness D of 34.3.

EXAMPLE 16

In a manner similar to Example 13, 126 kg of lauryllactam and 37.8 kg of dodecanedioic acid were reacted at 290° C. for 2 hours under autogenous pressure after having purged the reactor several times with nitrogen. After restoring to atmospheric pressure, 82 kg of PTMG having an $\overline{Mn}$ of 1,000 were introduced and the mixture was permitted to react at 240° C. for 3 hours under a stream of nitrogen at atmospheric pressure.

After homogenization under autogenous pressure with 9.54 kg of hexamethylenediamine for 1 hour at 240° C., the reaction mixture was transferred into a stainless steel reactor provided with an anchor stirrer and then decreased to atmospheric pressure over the course of 1 hour. 240 g of an 84% aqueous solution of phosphoric acid were introduced into the reaction mixture, which was progressively placed under a reduced pressure of $4 \times 10^3$ Pa. After polymerization under these conditions for 4 hours, a thermoplastic elastomer was obtained which had a melting point of 148° C., an inherent viscosity of 1.26 dl/g and a Shore hardness D of 42.7.

EXAMPLE 17 (comparative)

In a manner similar to Example 14, 15.394 kg of lauryllactam, 4.606 kg of dodecanedioic acid, 1.162 kg of hexamethylenediamine, 10 kg of PTMG having an $\overline{Mn}$ of 1,000 and 1 l of water were placed in a 100-l stainless steel autoclaved provided with an anchor stirrer. After purging several times with nitrogen, the mixture was heated, with stirring, to a temperature of 270° C. under a steam pressure of 15 bars and maintained under these conditions for 8 hours. After decreasing in 25 min to atmospheric pressure and applying sweeping with nitrogen, 37.1 of an 84% aqueous solution of phosphoric acid were introduced and the polycondensation reaction was continued at 270° C. under a stream of nitrogen at atmospheric pressure for 4 hours. A thermoplastic elastomer was obtained which had an inherent viscosity of 1.58 dl/g, a melting point of 146° C. and a Shore hardness D of 47.3.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A block copolyetheramide having the formula:

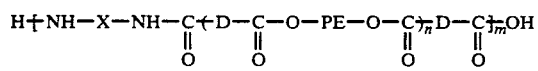

in which D is the residue of a diacid oligamide having an $\overline{Mn}$ ranging from 300 to 3,000 and/or the residue of the diacid chain limiter; PE is the residue of a polyetherdiol having an $\overline{Mn}$ ranging from 200 to 5,000; X is a straight or branched chain (cyclo)aliphatic or aromatic hydrocarbon having from 4 to 20 carbon atoms; n is a number ranging from 1 to 4; and m is an average number ranging from 2 to 50.

2. The block copolyetheramide as defined by claim 1, said diacid oligamide having an $\overline{Mn}$ ranging from 500 to 2,000 and said polyetherdiol having an $\overline{Mn}$ ranging from 200 to 2,000.

3. The block copolyetheramide as defined by claim 1, wherein X has from 6 to 15 carbon atoms.

4. The block copolyetheramide as defined by claim 1, wherein n is about 1.

5. The block copolyetheramide as defined by claim 1, wherein m ranges from 5 to 20.

6. The block copolyetheramide as defined by claim 1, said diacid oligamide comprising a polylactam and/or a poly(amino acid).

7. The block copolyetheramide as defined by claim 1, said diacid oligamide comprising the polymerizate of at least one diacid with at least one diamine in the presence of a diacid chain limiter, or salt thereof.

8. The block copolyetheramide as defined by claim 6, said diacid oligamide comprising polycaprolactam or polydodecalactam.

9. The block copolyetheramide as defined by claim 1, said polyetherdiol comprising at least one of PEG, PPG, PTMG and a random and/or block copolymer of ethylene glycol, propylene glycol and/or butylene glycol.

10. The block copolyetheramide as defined by claim 1, having an inherent viscosity ranging from 0.6 to 2.5 dl/g.

11. The block copolyetheramide as defined by claim 10, having an inherent viscosity ranging from 0.8 to 2 dl/g.

12. The block copolyetheramide as defined by claim 11, having an inherent viscosity ranging from 1 to 1.8.

13. The block copolyetheramide as defined by claim 1, wherein X is m-xylylene.

14. The block copolyetheramide as defined by claim 1, wherein X is hexamethylene.

15. The block copolyetheramide as defined by claim 1, wherein X is dodecamethylene.

16. The block copolyetheramide as defined by claim 1, wherein X is bis(4-cyclohexylyl)methane.

17. A process for the preparation of a block copolyetheramide having the formula:

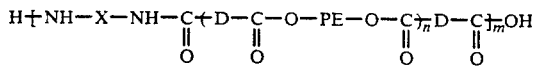

in which D is the residue of a diacid oligamide having an $\overline{M}n$ ranging from 300 to 3,000 and/or the residue of the diacid chain limiter; PE is the residue of a polyetherdiol having an $\overline{M}n$ ranging from 200 to 5,000; X is a straight or branched chain (cyclo)aliphatic or aromatic hydrocarbon having from 4 to 20 carbon atoms; n is a number ranging from 1 to 4; and m is an average number ranging from 2 to 50, comprising polycondensing a multiblock polymer having the formula:

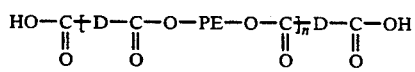

with a diamine $H_2N-X-NH_2$.

18. A thermoplastic elastomer shaped article comprising the block copolyetheramide as defined by claim 1.

19. The shaped article as defined by claim 18, comprising an extrudate, film, sheath or molded article.

20. The block copolyetheramide as defined by claim 1, having an $\overline{M}n$ ranging from 10,000 to 50,000. claim 1, having an $\overline{M}n$ ranging from 10,000 to 50,000.

* * * * *